United States Patent Office 2,973,353
Patented Feb. 28, 1961

2,973,353
CARBOHYDRATE MONO-ESTERS

Van R. Gaertner, Dayton, Ohio, assignor to Monsanto Chemical Company, St. Louis, Mo., a corporation of Delaware No Drawing. Filed June 29, 1956, Ser. No. 594,697

8 Claims. (Cl. 260—234)

The present invention is directed to higher molecular weight $\beta$- or $\gamma$-carboxy carboxylic acid mono-esters of carbohydrates. The present invention is also directed to methods of preparing mono-carbohydrate esters involving the reaction of a higher hydrocarbon or oxahydrocarbon substituted cyclic acid anhydride with a carbohydrate in the presence of a tertiary amine catalyst.

An object of the present invention is to provide valuable surfactants and a method of preparing such surfactants from carbohydrates—an abundant and inexpensive raw material.

My new higher carboxy carboxylic acid carbohydrate mono-esters have surfactant properties which make them useful as emulsifying agents, wetting agents, and foaming agents.

The new esters of my invention can be represented by the structure:

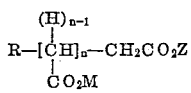

in which Z is a monovalent carbohydrate radical containing no more than two saccharide units, R is a monovalent organic radical containing 6 to 20 carbon atoms, M is hydrogen or a salt-forming cation, and $n$ is an integer from 1 to 2.

The terms "higher" or "higher molecular weight" are used herein in referring to esters in which the acid residue has at least 10 carbon atoms.

Some of my preferred esters are the $\beta$-carboxy aliphatic carboxylic esters of sugars and sugar alcohols. Such compounds can be represented by the structure:

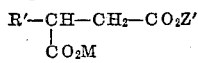

in which Z' represents a sugar or sugar alcohol, R' represents a monovalent aliphatic radical of 6 to 20 carbon atoms, and M represents hydrogen or a salt-forming cation. The term "carboxy" is defined in the present specification as the radical "—$CO_2M$" covering both the free carboxy groups and carboxy salt groups. It is still more preferred that R' in the above structure have 10 or more carbon atoms.

The term "carbohydrate" as used herein is intended to include the sugar alcohols, i.e., the polyols such as sorbitol, as well as the sugars, glycosides, etc. The carbohydrate portion of my new esters can be a residue of any one or mixtures of the foregoing, e.g., a ketose, aldose, $\alpha$- or $\beta$-glycoside, disaccharide, etc., such as glucose, fructose, methyl-$\alpha$-D-glucoside, sorbitol, sucrose, and similar materials. It is preferred that the carbohydrate portion be formed from a reducing or non-reducing disaccharide, e.g., lactose, maltose, or sucrose. Also very suitable are the ester compounds formed from other sugars having up to two saccharide units, from ketopentoses or ketohexoses, or from glycoside derivatives of sugars, particularly from glycosides of pentoses or hexoses. Among the useful ketopentoses and ketohexoses are D-fructose, L-sorbose, L-xylulose, etc. Examples of useful glycosides are $\alpha$-methyl D-glucoside, $\beta$-methyl D-glucoside, $\beta$-methyl fructoside, $\gamma$-methyl glucoside, $\gamma$-methyl L-fructoside, and other aldosides from the methyl-, ethyl-, propyl-, isopropyl-, butyl-, isobutyl-, cyclohexyl-, and phenyl arabinosides, glucosides, galactosides, etc.

In addition to the above, the carboxy aliphatic acid carbohydrate esters of polyols such as sorbitol, D-mannitol, D-arabitol, xylitol, etc. are useful surfactants.

While, in general, any carbohydrate can be used for the esterification reaction described herein, those resulting compounds in which the carbohydrate portion is a saccharide containing no more than two saccharide units, such as a sugar or sugar alcohol, have greater solubility in water and otherwise have more useful surfactant properties. Such sugars or sugar alcohols are polyhydric alcohols, usually containing at least four hydroxyl groups, having all of their carbon atoms attached to at least one oxygen atom, and preferably having at least five carbon atoms. The carbohydrate portion of my preferred compounds ordinarily does not have a molecular weight greater than about 500; the total molecular weight of my new compounds is ordinarily less than 1000.

My new compounds are essentially monomeric mono-esters, i.e., each carbohydrate portion is chemically bonded to only one carboxy carboxylic acid residue. Because of the greater reactivity of the primary hydroxyls in the carbohydrates, there is little tendency to esterify more than one hydroxyl of the carbohydrates. When the carbohydrate is sucrose, it is believed that for the most part the acid anhydride esterifies only the primary hydroxyl on the glucose moiety, because of the recognized greater reactivity of this hydroxyl group. Similarly there is no tendency toward the formation of a diester from the dicarboxylic acid anhydride, for when one ester group is formed, the simultaneously formed free carboxyl group is extremely resistant to esterification. The ester group is formed on the carboxyl group non-gem to the hydrocarbon or oxahydrocarbon substituent, as such "primary" carboxyls are more readily esterified.

The following examples illustrate certain specific embodiments of my invention.

EXAMPLE 1

Triisobutenylsuccinic anhydride, 53.2 grams (0.20 mole), and 75.2 grams (0.22 mole) of crystalline confectioner's sugar were treated with 2.5 gram (2% by weight) of dry pyridine and stirred and heated at 100 to 125° C. for about 24 hours. The rather fluid suspension thickened during the heating period. At 3 hours, and 6 hours, 5-ml. portions of pyridine were added with no apparent effect other than thinning the reaction mixture. At six hours a sample of the reaction mixture was only partly soluble in hot water, indicating that some of the anhydride was still present. A 97-gram portion of the 141 gram crude product was heated in 250 ml. water until it had dissolved except for a little tarry material. The solution was filtered (with the help of filter-aid) to give an amber filtrate which thickened upon cooling. A sample of the filtrate had foaming properties, particularly when it was made alkaline. The water was aspirated off the filtrate, and replaced with isopropanol; the solvent was aspirated off several more times, being replaced with new isopropanol before each aspiration.

The resulting black solution was then neutralized to pH 7.2 with 56 ml. of ethyl alcohol solution containing 20 grams KOH per 100 ml. solution. A solid, 2.7 grams, was removed by filtration. The filtrate was dried by the addition of isopropanol followed by aspiration to leave 87 grams of very viscous dark brown material, the potassium salt of sucrose triisobutenylsuccinate. This "water-purified" product (I) gave the following analysis:

Calcd. for $C_{28}H_{47}O_{15}K$: C, 50.7; H, 7.16. Found: C, 48.06; H, 7.82.

Apparently the product is contaminated by a small amount of sugar.

The rest of the crude product above, 44 grams, was stirred with acetone; all of the material dissolved except about 10 grams of off-white material which was removed from the solution. Acetone was evaporated from the solution and the gummy residue was digested by heating with hot water and filter aid, and the thick, viscous solution was filtered. The filtrate was diluted with isopropanol, and aspirated to remove water, leaving a liquid product. The liquid product was neutralized to pH 7+ with alcoholic KOH (10 ml. of ethyl alcohol solution containing 20 grams KOH per 100 ml. solution), and aspirated to remove the solvents, leaving 11 grams of brown material, the potassium salt of sucrose triisobutenylsuccinate, which was dissolved in 11 grams of isopropanol and designated as the "acetone-water purified" product (II).

The total yield of the potassium salt of sucrose triisobutenylsuccinate was 98 grams, 81% of theory. There was some loss of material in the process due to foaming during aspiration, and holdup of solution in the filtration steps.

EXAMPLE 2

Anhydrous sorbitol, 18.2 grams (0.1 mole) and 26.6 grams (0.1 mole) of triisobutenylsuccinic anhydride were mixed and heated to 50° C., and 2 ml. pyridine was added, with no apparent effect. The mixture was stirred and heated for 18 hours at 120° C. under nitrogen. A homogeneous amber solution was produced. The hot solution was dissolved in 20 ml. of isopropanol. Then KOH in ethyl alcohol (20 grams/100 ml. solution) was added, the pH rising from 4+ to 7.5 and finally to about 8. A total of 25 ml. of the alcoholic KOH was added. In the last stages of neutralization the syrup was completely water soluble. The syrup contains about 48.3 grams (theoretical amount) of the potassium salt of sorbityl triisobutenylsuccinate in a total of 71.8 grams of syrup, or an active content of 67.3%. The syrup can be used per se as a surfactant.

My new compounds include the mono-carbohydrate esters of substituted succinic and glutaric acids, and their salts. The acids for the esterification must have a side chain of 6 to 20 or more carbon atoms for the ester to have desirable surfactant properties. Particularly suitable acids can be prepared by condensing compounds of about 6 to 20 carbon atoms such as mono-olefins, alkyl chlorides, or aliphatic alcohols with $\alpha,\beta$-unsaturated acid anhydrides or the esters thereof in the monomer described in Patents No. 2,283,214 and No. 2,380,699 to Lucas P. Kyrides. It is particularly preferred to use the condensation products of olefins such as diisobutylene, triisobutylenes, tetraisobutylenes, tetrapropylenes, etc. with maleic acid or maleic anhydride; maleic acid may be replaced by its isomeric form, fumaric acid. The substituted succinic and glutaric acids must be in the form of their anhydrides for the esterification process of the present invention, as little or no esterification takes place when the free dicarboxylic acids are reacted. The aforenamed polyalkylenes can, for example, be prepared by polymerization of isobutylene or propylene with sulfuric acid or metal halides, or result from simultaneous dehydration and polymerization of tertiary butyl alcohol or isopropyl alcohol by concentrated sulfuric acid.

The products of the olefin and maleic anhydride condensation can be represented by the formula:

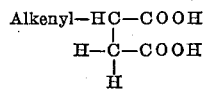

in which alkenyl represents the olefinic residue, e.g., the triisobutylene residue; the olefinic unsaturation is retained in the residue. The mono-carbohydrate esters of such acids, and their salts, can be represented by the formula:

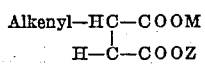

in which Z and M have the same meaning as hereinbefore.

Among the various acids which, in the form of their anhydrate, can be mono-esterified with a carbohydrate to give a useful surfactant are dodecylsuccinic acid, tetrapropylenesuccinic acid, 3-dodecyl-pentan-1,5-dioic acid, 2-isooctylpentan-1,5-dioic acid, 3-hexylpentan-1,5-dioic acid, tetraisobutenylsuccinic acid (3-phenylpropyl)-succinic acid (5-cyclohexylpentyl)-succinic acid, eicosylsuccinic acid, etc. The cyclic anhydrides containing 5 to 6 atoms in their rings are preferred, both because of higher stability and greater availability.

A few examples of the new surfactant mono-esters of my invention are: monosorbityl diisobutenylsuccinate, mono-$\beta$-methylfructoside tetrapropenylsuccinate, monomaltose tridecyloxysuccinate, mono-L-sorbose tetraisobutenylsuccinate, mono-D-mannitol eicosylsuccinate, glucose 3-hexadecylpentan-1,5-dioic acid mono-ester, etc. The above mono-carbohydrate esters have a free —C(O)OH group and are useful as such. However, they are generally utilized in the form of a water soluble salt, such as can be formed with a cation, particularly water solubilizing salt-forming cations. Suitable cations are usually alkali metals, alkaline earth metals, organic amines, or an ammonium ion. Representative cations which are effective are $Na^+$, $Ca^+OH$, $NH_4^+$, $K^+$, etc.; in fact, any of the salts obtained by neutralizing the free acid group with the following bases are useful: ammonia, ethanolamine, diethanolamine, triethanolamine, ethylamine, t-butylamine, t-octylamine, morpholine, lime, calcium carbonate, magnesium carbonate, potassium hydroxide, etc.

It is usually desirable in the process of the present invention to react the aliphatic hydrocarbon substituted succinic or glutaric anhydride with carbohydrate in approximately equimolar amounts. However, larger or smaller amounts of either reactant can be used, e.g., 0.75 to 1.25 moles of the cyclic acid anhydride for each mole of carbohydrate. The reaction is conducted by heating the reactants together in the presence of a catalyst until the reaction is complete, i.e., until all of the cyclic acid anhydride, or whichever reactant is not present in excess, has reacted. In general, temperatures of 75 to 150° C. for about 10 to 30 hours are satisfactory, the shorter reaction times ordinarily being used with the higher reaction temperatures.

A basic catalyst is required for the esterification reaction. The reaction is conducted in the presence of a base which will not react with the acid anhydride or otherwise deleteriously affect the esterification reaction. Tertiary amines are very suitable catalysts, e.g., pyridine, picoline, collidine, N-ethylpiperidine, triethylamine, tributylamine, diethylcyclohexylamine, and various other alkyl, cycloalkyl, cyclic and heterocyclic tertiary amines. The amounts of the catalyst can vary considerably, e.g., from 1 to 10 or 20% of the reaction mixture.

In Table I below the foaming and lathering ability of the surfactants of the present invention is shown in terms of lather heights as measured by the Ross-Miles test (Ross, J. and G. D. Miles, Oil and Soap, vol. 18 pp. 93–102 (1941).

Table I

| Carbohydrate Ester Salt Surfactant (0.1% Concentration) | Centimeters of Lather | | | |
|---|---|---|---|---|
| | Soft Water (50 p.p.m.) | | Hard Water (300 p.p.m.) | |
| | At Once | After 5 Min. | At Once | After 5 Min. |
| Potassium sucrose triisobutenylsuccinate (water purified) | 3.7 | 3.3 | 12.3 | 12 |
| Potassium sucrose triisobutenylsuccinate (acetone purified) | 2.7 | 2.1 | 8.7 | 8.5 |
| Potassium sorbityl triisobutenylsuccinate | 5.7 | 4.4 | 0.9 | 0 |

The 0.1% concentration (grams/milliliter) is the concentration of active material present in aqueous solution, i.e., the concentration is based upon the calculated amount of the stated carbohydrate ester salt in the surfactant. It will be noted that the potassium salt of sucrose triisobutenylsuccinate in particular has good lathering and stability properties in hard water.

Table II below shows the wetting time in seconds for the surfactants of the present invention.

Table II

| Wetting Agent | Concentration of Solution | |
|---|---|---|
| | 0.5 | 0.25 |
| Potassium sucrose triisobutenylsuccinate (water purified) | 16.6 | 64.0 |
| Potassium sorbityl triisobutenylsuccinate | 6.1 | 13.6 |

The values recorded in the body of the table are the time intervals in seconds necessary for a 1.5 gram weight to cause a 5 gram skein of cotton yarn to sink in the stated concentration (% by grams per milliliter of solution) of the wetting agent in aqueous solution (Draves-Clarkson test, Amer. Dyestuff Reporter, 28, 420–428, Aug. 7, 1939).

Table III

| Carbohydrate Ester | Surface Tension, Percent Conc. | | | Interfacial Tension, Percent Conc. | | | Spreading Coeff., Percent Conc. | | |
|---|---|---|---|---|---|---|---|---|---|
| | 1.0 | 0.25 | 0.0625 | 1.0 | 0.25 | 0.0625 | 1.0 | 0.25 | 0.0625 |
| Potassium sucrose triisobutenylsuccinate (water purified) | 30.7 | 32.7 | 34.8 | 4.0 | 6.2 | 10.0 | −0.2 | −4.4 | −10.4 |
| Potassium sucrose triisobutenylsuccinate acetone-water purified) | 31.0 | 32.2 | 36.1 | 4.3 | 5.8 | 10.5 | −0.8 | −3.5 | −12.1 |

In Table III above are recorded the surface tension interfacial tension, and spreading coefficient for potassium sucrose triisobutenylsuccinate.

The concentrations (grams/100 ml.) above are based on the amount of active material in the solution. The reported values for surface tension and interfacial tension are dynes/cm. as determined by a Du Nouy tensiometer for the stated concentrations of the agents in distilled water. For the interfacial determination, the ring of the tensiometer was immersed in the aqueous layer, which was then covered with a layer of Nujol (paraffin oil). The spreading coefficient is a calculated value which equals:

(Surface tension of Nujol)—(Surface tension of the solution + interfacial tension)

The surface tension of Nujol is 34.5. Ordinarily, the lower the surface and interfacial tensions of a system, the more readily emulsions are formed or surfaces are wet. The low values for the surface tension and interfacial tension in Table I indicates utility of the mono-carbohydrate alkenylsuccinate type salts of the present invention as emulsifying agents for various types of emulsions, e.g., for oil-in-water emulsions; the low values also indicate utility as wetting agents for wetting various types of surfaces. Ordinarily the closer the spreading coefficient is to a positive value, the greater the spreading value of a system; the very low negative values in the table indicate utility as an emulsifier or wetting agent.

My novel mono-carbohydrate esters of hydrocarbon or oxahydrocarbon substituted succinic and glutaric acids are water soluble liquids. In this respect they differ from most carbohydrates and carbohydrate ester compounds, as most such compounds are solids, usually crystalline solids.

Of the new surfactant compounds of the present invention, the mono-sucrose alkenylsuccinates and their salts are the most preferred. Such compounds are very effective in lowering the surface tension of liquids. Moreover, sucrose is readily available and inexpensive.

Because of their property of lowering the surface activity of liquids, the new compounds of the present invention are eminently desirable for many applications. Among such uses are use as an emulsifying agent, dispersing agent, wetting agent, foaming agent, etc.

Novel higher β- or γ-carboxy carboxylic acid mono-esters of carbohydrate compounds and their use as surfactants have been described. A method of preparing mono-carbohydrate esters by the reaction of a hydrocarbon or oxyhydrocarbon substituted cyclic acid anhydride has been described.

I claim:

1. As new compounds, the water soluble carboxy carboxylic acid mono-esters of carbohydrates, said carboxylic acids having 10 to 25 carbon atoms, and there being no more than 3 carbon atoms between said carboxy group, and said carboxylic acid ester group, the carbohydrates being saccharides containing no more than two saccharide units.

2. The compounds of claim 1 in which the carboxy group is a carboxylic acid salt group.

3. As new compounds, the mono-(polyhydric alcohol) esters of an alkenylsuccinic acid, said alkenyl group containing at least 6 carbon atoms, the polyhydric alcohol having had at least four free hydroxyl groups prior to esterification and having had all of its carbon atoms attached to at least one oxygen atom, and having had a formula weight no greater than 500.

4. As new compounds, the β-carboxy aliphatic carboxylic acid mono-esters of sucrose, said carboxylic acid containing 10 to 25 carbon atoms.

5. As new compounds, the water-soluble metal salts of mono-sucrose alkenylsuccinate.

6. As a new compound, potassium sucrose triisobutenylsuccinate.

7. As a new compound, a water-soluble alkali metal salt of mono-sorbityl triisobutenylsuccinate.

8. A composition comprising a β-carboxy aliphatic carboxylic acid mono-ester of sucrose, said carboxylic acid containing 10 to 25 carbon atoms, said mono-ester of sucrose being in substantially pure form contaminated by no more than a small amount of unesterfied sucross.

References Cited in the file of this patent
UNITED STATES PATENTS

| | | |
|---|---|---|
| 2,613,206 | Caldwell | Oct. 7, 1952 |
| 2,661,349 | Caldwell et al. | Dec. 1, 1953 |
| 2,868,781 | Gaertner et al. | Jan. 13, 1959 |